Jan. 4, 1938. G. R. GREENSLADE 2,104,645
MEANS FOR TESTING BOILER STAYBOLTS
Filed June 20, 1935 2 Sheets-Sheet 1
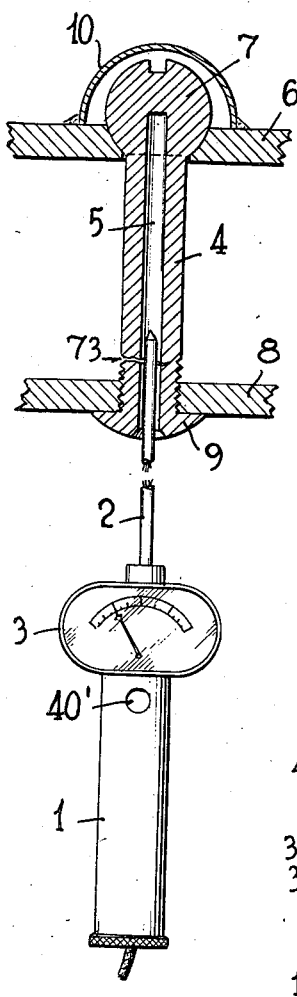
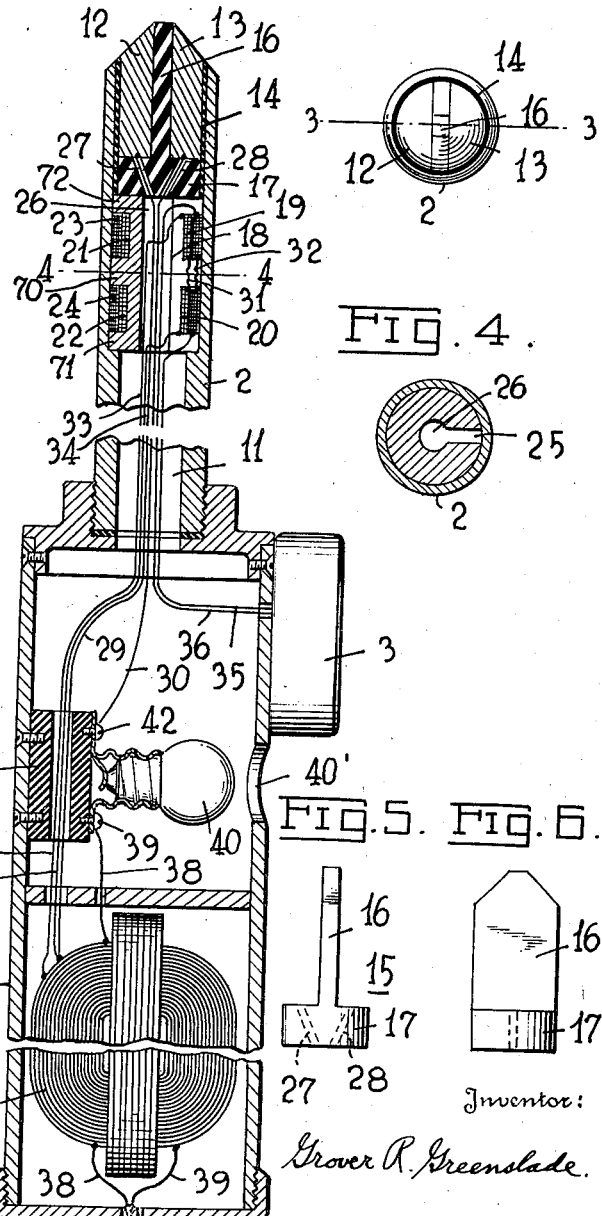
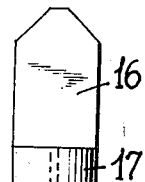
Inventor:
Grover R. Greenslade.
By Frank H. Wisch.
Attorney Jan. 4, 1938.  G. R. GREENSLADE  2,104,645
MEANS FOR TESTING BOILER STAYBOLTS
Filed June 20, 1935   2 Sheets-Sheet 2

Inventor:
Grover R. Greenslade.
By Frank H. Wisch.
Attorney

Patented Jan. 4, 1938

2,104,645

UNITED STATES PATENT OFFICE 2,104,645

MEANS FOR TESTING BOILER STAYBOLTS

Grover R. Greenslade, Scott Township, Allegheny County, Pa., assignor to Pittsburgh Dry Stencil Company, a corporation of Pennsylvania Application June 20, 1935, Serial No. 27,587

6 Claims. (Cl. 175—183)

This invention relates to apparatus for testing telltale staybolts to determine the condition thereof. More particularly it relates to means for determining the condition of the telltale hole of a telltale staybolt and also the presence or absence of fractures in such bolts.

Patent No. 1,567,728 for means for testing boiler staybolts discloses a device provided with a rod-like element adapted for insertion in the telltale hole of a telltale staybolt. The rod-like element is provided at one end with a contact member comprising a single piece of metal insulated from the said element. When the latter element is inserted in a telltale hole and when the contact member reaches the original closed end of the telltale hole, an electric circuit which includes the contact member, a battery, an indicating means, and also the rod-like element, is completed when the side of the latter element touches the side of the telltale hole of the staybolt. Modifications of the above device are also described in the patent, in which modifications a grounding means is necessary for completion of the circuit. The grounding means is shown as a connecting wire provided with a contact member adapted for electrical connection with some portion of the firebox, or other part of the boiler structure.

An implement of the type described in the above patent is employed only for the purpose of determining whether telltale holes of telltale bolts are open from their mouths to their original closed ends. Obstructing material may be present in a telltale hole in various forms including for instance rust or corrosion or residue from evaporation of boiler water that seeps into the telltale hole when there is a fracture in the bolt. When such material is found present it is removed as for instance by drilling and when the testing implement indicates that the telltale hole is open throughout its entire length, the hydrostatic test is applied to the boiler to determine the fractured or broken bolts by observing leakage through the telltale holes thereof.

In the device of the present invention, contact elements are so positioned with respect to the testing rod adapted to be inserted in the telltale hole of a telltale staybolt, that contact between the side of the rod and the side of the telltale hole is not necessary in order to complete a test of the staybolt. Also, no connection for grounding the implement on the boiler structure is necessary. Spaced contact elements are provided and when these touch the original closed end of the telltale hole, means associated with the device will indicate this. The latter means however will not necessarily indicate that the bolt is in good condition. Means are also associated with the device for determining whether or not the bolt has any imperfections. A more complete testing unit is thus provided with cooperating means which inform an operator that fractures are present or absent in a bolt and also that the bolt has been tested for fractures throughout the entire original length of the telltale hole particularly in such portions of the bolt that may possibly become fractured when in use.

In the accompanying drawings, there are shown, merely for purposes of illustration, certain embodiments of my invention, it being understood that the drawings do not define the limits of the invention, as changes may be made in the construction and operation therein disclosed without departing from the spirit of the invention or scope of the appended claims.

In the drawings:

Fig. 1 is a view showing one modification of a testing instrument in side elevation and the manner in which it is employed in testing a telltale staybolt, the staybolt being shown in section;

Fig. 2 is an enlarged end view of the free end of a testing rod shown in Fig. 1;

Fig. 3 is a view on line 3—3 of Fig. 2, showing an enlarged longitudinal section of the testing instrument shown in Fig. 1;

Fig. 4 is a sectional view of the instrument on line 4—4 of Fig. 3;

Figs. 5 and 6 are detail views of parts of the device of the present invention;

Figure 7:
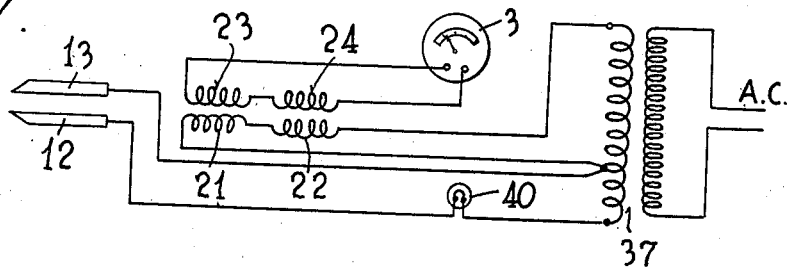
Fig. 7 illustrates the manner in which various parts of the device shown in Fig. 3 are connected electrically.

In Fig. 1, a testing implement comprising a handle 1, a testing rod 2, indicating means 3 and other means to be described below, is shown associated with a staybolt 4 and in position for testing the same. The bolt 4 is of the flexible telltale type used in locomotive boilers and is provided with a telltale hole 5. The bolt is shown in position extending from the outer or wrapper sheet 6, in which the headed end 7 is seated, to the inner or firebox sheet 8 of the boiler. The telltale hole 5 extends from the inner end or riveted end 9 of the bolt axially thereof into, but not through the head 7 of the bolt. A cap 10 encloses the head 7 and is welded to the sheet 6.

The arrangement of parts in the testing implement may be seen in detail in Fig. 3. The exploring rod 2 which is preferably provided with a passaage 11 throughout its entire length, is rigidly attached to the handle 1 which is preferably hollow.

Positioned adjacent the end of the testing rod 2 are spaced contact elements 12 and 13 which extend beyond the end of the rod and are insulated from the latter by an insulation member 14. The contact elements 12 and 13 are also insulated from each other. The outer ends of the contact elements are preferably bevelled toward the axis of the rod or are conical to prevent touching of the sides of the telltale hole of a bolt therewith when the rod is in position for a test. The inner ends of the contact elements 12 and 13 are embedded between the cylindrical insulating member 14 and an insulation member 15, two elevational views of which are shown in Figs. 5 and 6. The member 15 comprises a portion 16 that projects diametrically and longitudinally of the rod 2 from a portion 17, positioned laterally in the rod, to the outer ends of the contact elements 12 and 13. The narrower sides of the portion 16 of the member 15 may be tapered to conform with the contour of the ends of the contact elements.

Adjacent the inner ends of the contact elements and abutting the portion 17 of the member 15, is a magnetic flux generating means comprising a core member 18 provided with grooves 19 and 20 for energizing coils or primary windings 21 and 22 and superposed analyzing or secondary windings 23 and 24. The core 18 is constructed of ferrous metal and is preferably split or provided with a slot 25 (Fig. 4) extending radially from a central passageway 26 which serves as a convenient means for the passage of lead wires from the contact elements as well as from the windings to the handle 1. The slot 25 serves also to diminish eddy currents.

Passages 27 and 28 are provided in the portion 17 of the insulating member 15 for lead wires 29 and 30 which are electrically connected to the contact elements 12 and 13 respectively and pass through the rod 2 (preferably made of brass) to members of an electric circuit described below.

The primary windings 21 and 22 are connected in series by a wire 31 and are oppositely mounted so that current passing through them flows in opposite directions. The secondary windings 23 and 24 are connected in series by a wire 32 and are wound so that current passing through them flows in the same direction. The primary opposed windings are properly balanced by having an equal number of turns in the two grooves 19 and 20. Lead wires 33 and 34 from the primary windings pass to a source of alternating current and lead wires 35 and 36 from the secondary windings pass to the terminals of an indicator 3 which may be a microammeter or other suitable means, as for instance a lamp mounted on or in the handle. If desired the indicator 3 may be separate from the handle.

A transformer 37 connected to an alternating current source by wires 38 and 39 may be conveniently placed in the handle 1 or it may be separate from the handle. The transformer 37 is shown with three secondary taps. The lead wire 33, connected to one end of the primary windings on the core 18, and a lead wire 38 are connected to the ends of the secondary winding of the transformer 37. The lead wire 38 is connected to a terminal 39 of an incandescent lamp 40 mounted on an insulator block 41 opposite an opening 40' in the handle 1. The lead wire 30 from one of the contact elements 13 is connected to the other terminal 42 the lamp 40. The lead wire 29 from the contact element 12, and the lead wire 34 are connected to a common secondary tap on the transformer 37. Instead of a lamp 40, an ammeter or buzzer may be employed.

The wiring throughout the instrument is insulated and of any suitable gauge. The circuit employed in the device just described is diagrammatically illustrated in Fig. 7.

In making a test of a boiler staybolt of the telltale type, the testing rod 2 is inserted in a telltale hole of a telltale staybolt as shown in Fig. 1. As the tip proceeds towards the end of the telltale hole, the operator watches the indicator 3 and if any abnormal deflection of the needle occurs, this is an indication that a fracture exists in the bolt. The primary windings on the core 18 generate a magnetic flux that passes through the core between the flanges 70 and 71, and 70 and 72 in opposite directions. The flux also passes through the bolt adjacent the two grooves in opposite directions. Thus the flux generated by the winding 21 links around through the core, the flange 70, the bolt 4 and the flange 72; and the flux generated by the winding 22 links around through the core, the flange 70, the bolt 4 and the flange 71. It is seen therefore that a current is induced in the secondary windings which is indicated by the ammeter. When either one of the grooves 19 or 20 is opposite a fracture as shown at 73 the path of the flux is changed or the magnitude thereof weakened. The balance is upset and the needle on the ammeter changes its position thereby indicating a defect in the bolt.

As the rod 2 is moved closer to the end of the telltale hole the operator watches the light 40 through the opening 40' in the handle 1. If the tip touches an obstruction of the type described above, no light rays are seen in the handle. The operator then removes the rod 2 and removes the nonconducting accumulations from the telltale hole. If the lamp lights upon touching the end of the telltale hole, the operator knows from this that the bolt can be tested for fractures along substantially the entire length of said telltale hole. In the bolts shown in the drawings the telltale holes extend well into the head of the bolt so that all parts of the bolt that are subject to the greatest strains or stresses can be tested for fractures.

Figure 8:
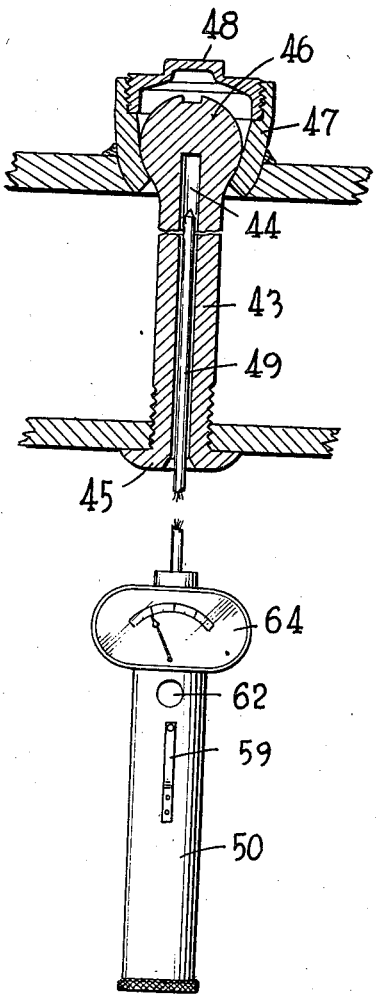
Fig. 8 is a view showing another modification of a testing implement in side elevation, associated with a staybolt of a modified type, the said staybolt being shown in section.
Figure 9:
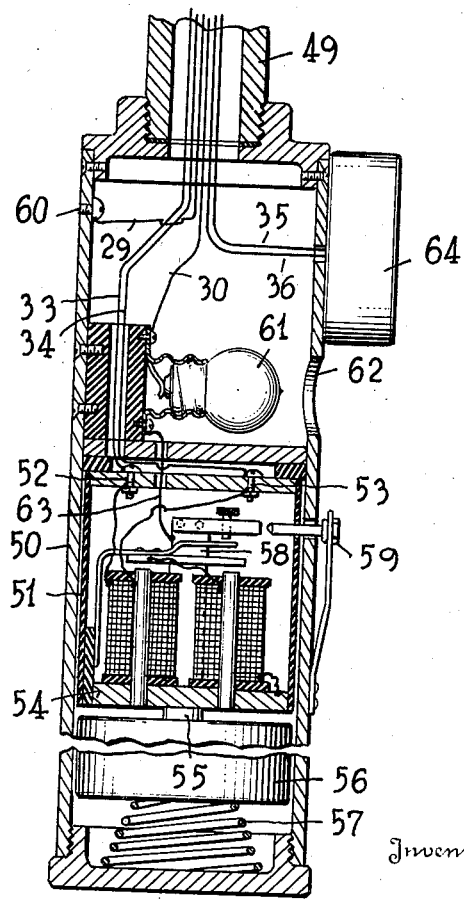
Fig. 9 is a longitudinal sectional view of the implement shown in Fig. 8.

In Fig. 8 a testing instrument of the type illustrated in detail in Fig. 9 is shown in position for testing a telltale bolt 43 provided with a telltale hole 44 extending axially through the bolt from the riveted end 45 into the headed end 46 provided with a closure comprising a sleeve 47 and a cap 48. The instrument shown in Figs. 8 and 9 is complete in itself, requiring no outside connections. The rod 49 equipped with the same parts shown in the rod 2 (Fig. 3) is rigidly attached to a handle 50.

Instead of connecting the primary windings on the core 18 (Fig. 3) to an alternating current source the lead wires 33 and 34 from said primary windings are connected to an interrupter designated generally by the numeral 51 the operation of which is readily understood. The terminals 52 and 53 to which the lead wires 33 and 34 respectively are connected, are connected to the secondary of the interrupter. The interrupter has a metal base 54 against which the terminal 55 of a battery 56 is pressed by a spring 57 which electrically connects the other terminal of the battery with the brass handle 50. The primary coil of the interrupter is connected to the base 54 and to the vibrator of the interrupter which is attached to but insulated from the said base 54. The circuit through the primary of the interrupter is completed through the contact point of the interrupter supported by but insulated from a post 58 of metal integral with the metal base 54; through the switch 59 (when pushed in), the handle 50, and the spring 57. The switch 59 is pushed in to complete the circuit when testing a bolt for fractures.

The lead wire 29 from one of the contact elements 12 at the tip of the rod 49 is connected to the handle at 60. The lead wire 30 from the other contact element is connected to a terminal of a lamp 61 opposite an opening 62 in the handle 50. The other terminal of the lamp 61 is connected by a wire 63 to the post 58. When the contact elements at the tip of the rod 49 touch the original closed end of the telltale hole 44 the light circuit is completed through the lead wire 29, handle 50, spring 57, battery 56, base 54 of the interrupter 51, post 58, wire 63, lamp 61, and wire 30.

The lead wires 35 and 36 from the secondary windings on the core 18 in the testing rod 49, are connected to a microammeter 64.

If desired the windings in the grooves 19 and 20 of the core 18 may be arranged in the form of a Wheatstone bridge circuit as set forth in application Serial No. 27,588, filed June 20, 1935.

In the latter application, the testing implement disclosed is provided with a core member similar to the core member 18 described above. Two strands of wire are wound side by side in each groove to form four inductive windings. One pair of windings in one groove is oppositely wound to the pair in the other groove and the windings in each groove are connected on opposite sides of a Wheatstone bridge circuit. The circuit is thrown out of balance when a groove in the core member is opposite a fracture in a bolt.

I claim:

1. Apparatus for testing telltale staybolts, which apparatus comprises spaced contact elements adapted to be inserted in the telltale hole of a telltale staybolt and adapted for movement therein to touch the original closed end of said telltale hole, means combined with the said contact elements for determining the presence or absence of fractures in the bolt while moving the contact elements along the telltale hole, and means for indicating contact of the said elements with the said end of said telltale hole.

2. Apparatus for testing telltale staybolts, which apparatus comprising spaced contact elements adapted to be inserted in the telltale hole of a telltale staybolt and adapted for movement therein to touch the original closed end of said telltale hole, a magnetic flux generating means, means for conducting induced current in said telltale hole, means for indicating changes in the induced current while the said contact elements are moved along the telltale hole, and means for indicating contact of the said elements with the said end of said telltale hole.

3. Apparatus for testing telltale staybolts, which apparatus comprises a rod-like member for insertion in the telltale hole of a telltale staybolt and adapted for movement in said telltale hole, spaced contact elements at the end of said rod-like member positioned to touch the end of the telltale hole when the said member is inserted the entire original length of the said telltale hole, means combined with the said rod-like member for determining the presence or absence of fractures in the bolt while moving the contact elements with said rod-like member along the telltale hole, a handle for the rod-like member, and indicating means electrically connected to said contact elements adapted to indicate whether the said contact elements have reached the original closed end of the said telltale hole.

4. Apparatus associated with a telltale staybolt, comprising spaced contact elements in the telltale hole of a telltale staybolt supported on means for moving the said elements in the telltale hole and positioned on said means to touch the original closed end of the telltale hole, means associated with the said contact elements for determining the presence or absence of fractures in the bolt while moving the contact elements along the said telltale hole, and indicating means electrically connected to said contact elements adapted to indicate whether the said contact elements have reached the original closed end of the said telltale hole.

5. Apparatus for testing telltale flexible staybolts provided with a head at one end which apparatus comprises means for determining the presence or absence of fractures in such bolts, said means being combined with spaced contact elements and the said means and the said contact elements adapted to be inserted in the telltale hole of a telltale staybolt and adapted for movement therein to such a position that said spaced contact elements touch the original closed end of said telltale hole within the head of the bolt, and means for indicating contact of the said elements with the said end of said telltale hole for establishing the fact that the presence or absence of fractures in the bolt has been determined throughout all breakable portions thereof.

6. In apparatus for determining the condition of telltale staybolts, the said apparatus including a tubular element for insertion and movement in a telltale hole of a staybolt, contact elements within the said tubular element and projecting beyond an end of the said tubular element, indicating means electrically connected to said contact elements adapted to indicate the closing of the indicator circuit by contact of the elements with the conducting material of the staybolt, and an insulating unit comprising a portion thereof extending between the contact elements and a portion extending across the tubular element, the said unit having passages in the latter portion thereof for conductor elements electrically connected to the said contact elements.

GROVER R. GREENSLADE.